(12) United States Patent
Xu et al.

(10) Patent No.: US 9,703,490 B2
(45) Date of Patent: Jul. 11, 2017

(54) COORDINATED UPGRADE OF A CLUSTER STORAGE SYSTEM

(71) Applicant: Datrium, Inc., Sunnyvale, CA (US)

(72) Inventors: Min Xu, Palo Alto, CA (US); John Cho, San Mateo, CA (US); R. Hugo Patterson, III, Los Altos, CA (US)

(73) Assignee: DATRIUM, INC., Sunnyvale, CA (US)

( * ) Notice: Subject to any disclaimer, the term of this patent is extended or adjusted under 35 U.S.C. 154(b) by 42 days.

(21) Appl. No.: 14/983,562

(22) Filed: Dec. 30, 2015

(65) Prior Publication Data

US 2017/0031602 A1 Feb. 2, 2017

Related U.S. Application Data

(60) Provisional application No. 62/197,540, filed on Jul. 27, 2015.

(51) Int. Cl.
| | |
|---|---|
| G06F 9/44 | (2006.01) |
| G06F 3/06 | (2006.01) |
| G06F 9/455 | (2006.01) |
| G06F 9/445 | (2006.01) |

(52) U.S. Cl.
CPC ............ *G06F 3/0607* (2013.01); *G06F 3/067* (2013.01); *G06F 3/0647* (2013.01); *G06F 8/62* (2013.01); *G06F 8/65* (2013.01); *G06F 8/665* (2013.01); *G06F 9/45545* (2013.01)

(58) Field of Classification Search
CPC ...... G06F 3/0607; G06F 3/0647; G06F 3/067; G06F 8/62; G06F 8/65; G06F 8/665; G06F 9/45545

USPC .................................................. 717/168–173
See application file for complete search history.

(56) References Cited

U.S. PATENT DOCUMENTS

| | | | | |
|---|---|---|---|---|
| 7,257,689 | B1* | 8/2007 | Baird ................... | G06F 11/1471 707/999.201 |
| 8,607,221 | B1* | 12/2013 | Donahue .................... | G06F 8/65 717/173 |
| 2012/0079474 | A1* | 3/2012 | Gold ......................... | G06F 8/65 717/173 |
| 2012/0266155 | A1* | 10/2012 | Valeriano ................... | G06F 8/65 717/172 |
| 2015/0188778 | A1* | 7/2015 | Asayag ............... | H04L 41/5041 709/224 |

* cited by examiner

*Primary Examiner* — Qing Chen
(74) *Attorney, Agent, or Firm* — Jeffrey Pearce

(57) ABSTRACT

A distributed storage system has at least one host and at least one storage node. Hosts write data to and read data from storage devices within the storage nodes. A host upgrade manager (HUM) is installed in at least one of the hosts; a secondary upgrade manager (SUM) is installed in at least one of the nodes; and a primary upgrade manager (PUM) is installed within the distributed storage system itself, for example, in one of the nodes or hosts. Host and node storage system software is upgraded by transferring, via the respective HUM and SUM, upgraded versions of the software from the PUM to at least one host or node detected to be running an outdated version. The host and node storage system software components comprise different, cooperating portions of overall storage management software.

52 Claims, 3 Drawing Sheets

COORDINATED UPGRADE OF A CLUSTER STORAGE SYSTEM

CROSS-REFERENCE TO RELATED APPLICATIONS

This application claims priority of U.S. Provisional Patent Application No. 62/197,540, filed 27 Jul. 2015.

FIELD OF THE INVENTION

This invention relates to an arrangement for installing and/or updating software in a distributed system, in particular, a distributed data storage system.

BACKGROUND

As computer systems become more and more distributed, the need for coordination increases. Distributed systems come in many forms. In some, a group of structurally identical or at least similar physical and/or virtualized processing systems perform essentially independent tasks, but may all benefit from coordination of, for example, software updates. In some others, the various processing systems perform independent parts of a single task, and in still others, such as distributed storage systems, the different systems appear from a functional level as a single entity. Coordination is, in some of these systems, necessary, and in most of them it is at least advantageous.

One obvious way to coordinate, for example, software installations or updates, among different systems is simply to stop their processing, individually or as a group, perform the installation/update, and then restart their processing. This procedure often disrupts availability, however, for longer than users prefer or can tolerate. As just one example, virtualized systems running VMware virtual machines (VMs) do not do collective upgrades; rather, what is recommended is putting hosts into a "maintenance mode" before upgrading, which means migrating the load off of the affected hosts, then upgrading, then migrating VMs from the next host to that one, followed by upgrading the next host, and so forth. The vCenter management software must therefore be able to handle the hosts running different software versions.

The need for efficient coordination is particularly acute in distributed storage systems, since each time one is taken offline for a software change, the system as a whole may become useless. In such distributed storage systems, not only data sets (defined in the broadest sense as any related collection of digital information, including both executable and non-executable data) as a whole but even different portions of single data sets may be stored on different devices, for example, as RAID stripes. Indeed, even unsophisticated users nowadays interact with storage systems in the "cloud", such that they may have no idea on which continent(s), much less on which server(s) or disk(s), their data resides. In such systems, there is typically some form of main, or "host" server, which is responsible for coordinating the read/write tasks directed to controllers in the various storage devices/systems. Efficient coordination of software changes on different member devices in such a distributed storage system presents various challenges:

1) Existing tools for managing host software and configuration (for example, Puppet) do not also manage storage appliance software; different tools are therefore often required for the host and controller side, which complicates software version management.

2) The diversity of tools for hosts and controllers means that upgrades are not easily coordinated across all the hosts and controllers. The nodes in the system may therefore not, in general, be running the same version of software at the same time. This means in turn that the system builder is faced with two choices: ensure that the different versions of the software interoperate, which adds significant complexity and software development expense, or shut the system down until all nodes are upgraded to the same release and then restart the system. As mentioned above, however, such an upgrade can take an unacceptably, or at best undesirably long, time and cause a significant outage.

3) Upgrading host-side storage software may require the host itself to be rebooted, which in and of itself causes an outage. Some virtualized server environments (like VMware) address the problem by sequentially putting hosts into a "maintenance mode". This is disruptive and slow, however, and will generally make upgrading storage software in this sort of distributed system more complex and onerous than upgrading just an independent storage controller that does not rely on software running on the hosts.

What is needed is therefore some mechanism and method for more efficiently allowing for software upgrades (defined as including installations, updates and other changes to or replacements of existing installations, etc.) on the different members of a distributed system, of which storage systems are but one example.

DETAILED DESCRIPTION

Disclosed here is a new system and method of operation that simplify software version management in distributed system environments, in particular, where one or more hosts communicate with a plurality of "nodes", such as storage servers that include software that is to be installed or in some way changed. The approach could be used to upgrade hosts in sequence, although this would in many cases require that the different versions of software interoperate. The preferred implementation therefore upgrades all hosts and nodes together within a time window that, relative to known solutions, is shorter and minimizes disruption to the running systems. In some embodiments, and depending on the system configuration and scheduling, there will be no need to ensure interoperability of dissimilar software versions, since all the hosts and nodes can run the same version. Embodiments of the invention may be used to upgrade substantially any type of host and/or node software. The invention is particularly advantageous, however, where the software to be monitored and updated comprises interoperating, cooperating, host-node software, that is, software at different levels of the storage system, but that cooperates to ensure proper operation of overall storage system.

Figure 1:
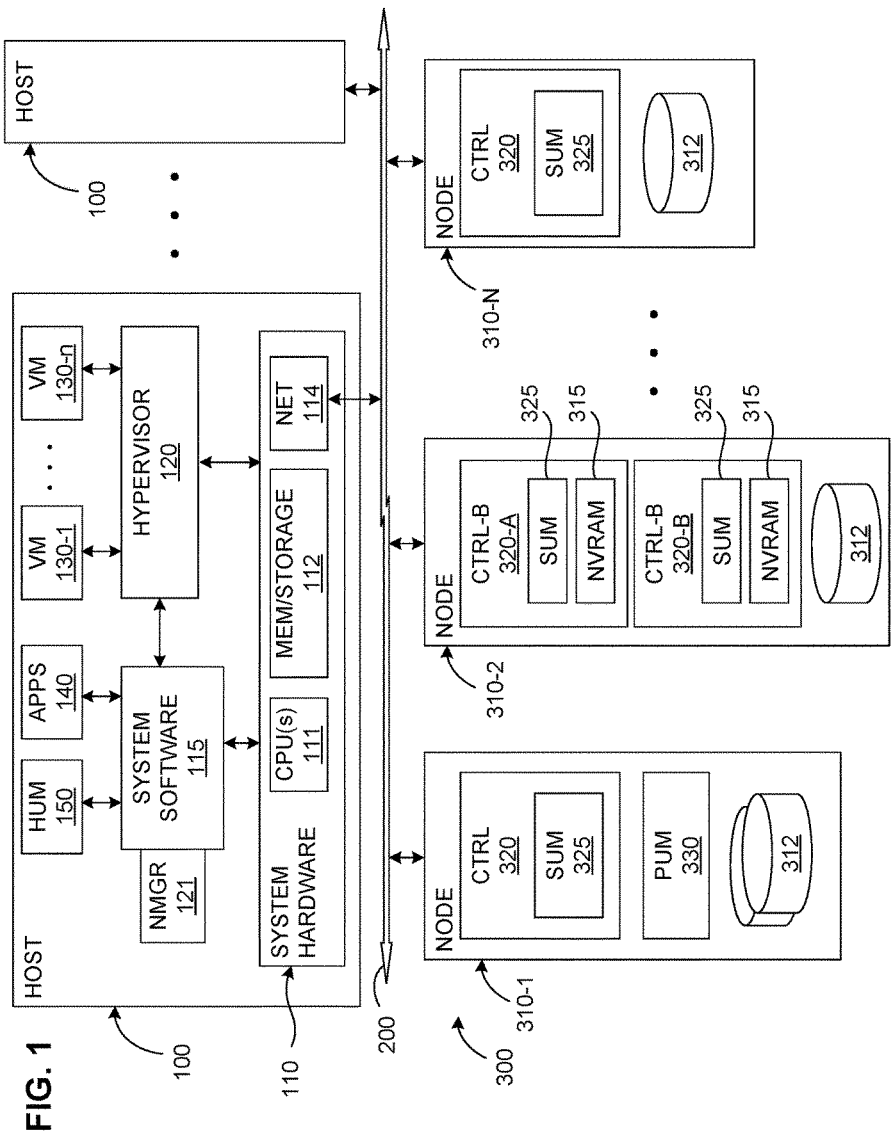
FIG. 1 illustrates the main components of a novel coordination system.

FIG. 1 illustrates the main components of a basic embodiment of the invention. Each of one or more host platforms 100, which may and typically will be servers, includes system hardware 110, including one or more processors (CPU's) 111, and some device(s) 112 for non-persistent, volatile and/or persistent, non-volatile, non-transitory storage. The line between what is a "storage device" and "memory" is no longer as bright as it once was, however (consider SSD and NVRAM technologies, for example) and the embodiments described here do not presuppose such a distinction.

The hardware 110 will also include other conventional mechanisms such as a network connection device 114 for transfer of data between the various components of the system and one or more network(s) 200, which may be any known public or proprietary local or wide-area network such as the Internet, an internal enterprise network, etc. Note that, depending on the implementation and nature of the system, the host(s) may even communicate with external entities, such as nodes 300, over different networks, thereby allowing some parallel operations. The only requirement is that, whatever network(s) is/are used, the host 100 should be able to transmit and receive data to and from the nodes 300 it needs to access. "The" network 200 is therefore to be read as the collection of whichever networks are implemented, along with any necessary switching or other communications devices if data needs to pass between different networks.

The host will also include conventional system software 115 such as, depending on the implementation, an operating system (OS), device drivers, etc. User-level applications 140 then run in the known manner on the system software. A node manager software component NMGR 121 is also shown within the host. This component 121 may be included to direct and handle whatever operations of the nodes that the host is responsible for. For example, where the nodes are storage devices (such as in a RAID system, or the DVA system described below), the NMGR 121 may be responsible for formatting storage requests from clients (for example, different VMs, or other processes) and distributing the data to be stored to the appropriate nodes. As FIG. 1 illustrates, the NMGR 121 code may be either separate from the other system software 115, or could be a part of it.

As FIG. 1 illustrates, if a host supports a virtualization platform, it will typically include some form of hypervisor 120, which forms the interface layer between the system hardware 110 and (in the illustrated embodiment) at least one virtual machine (VM) 130-1, . . . , 130-n. As is well known, VM is a software abstraction of an actual physical computer system. The VMs are shown in FIG. 1 as being within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc, run directly on "bare metal", that is, directly on the system hardware 110, with no need for interaction with a host OS, such as the system software 115. In other virtualization platforms, the hypervisor may run on or at the same level as the host OS 115, which supports and performs some operations upon calls from the hypervisor. The various embodiments of the invention described here do not depend on any particular virtualization architecture, whether for the VMs, the hypervisor(s) or other virtualization layers. Indeed, the invention does not presuppose VMs at all.

The nodes 310-1, 310-2, . . . , 310-N (referenced collectively as 300) will be any form of system that requires coordination among them for software upgrades, which include software installations, updates, etc Although not illustrated (merely for the sake of simplicity), each node will typically include one or more processors, as well as non-transitory, volatile or non-volatile storage for the executable code that the processor(s) execute to perform the steps used to implement embodiments of this invention.

In implementations such as where the nodes represent storage devices, each node will typically include one or more persistent storage devices 312 such as, for example, a disk drive, flash SSD, etc., as well as some form of storage controller 320, 320-A, 320-B, which includes controller software. Depending on other design considerations, nodes may include either a single controller (such as the illustrated 310-1 and 310-N), or multiple controllers (such as shown for 310-2). Controllers may include their own local high-speed storage such as NVRAM 315 available, for example, for local caching or caching for hosts or other nodes. In multi-controller nodes (310-2), each controller preferably includes a conventional high-speed communication link between the controllers. Even other implementations will typically have some form of controller, or at least controller software, which may be an operating system, or control software for some specialized hardware device within the node.

Figure 3:
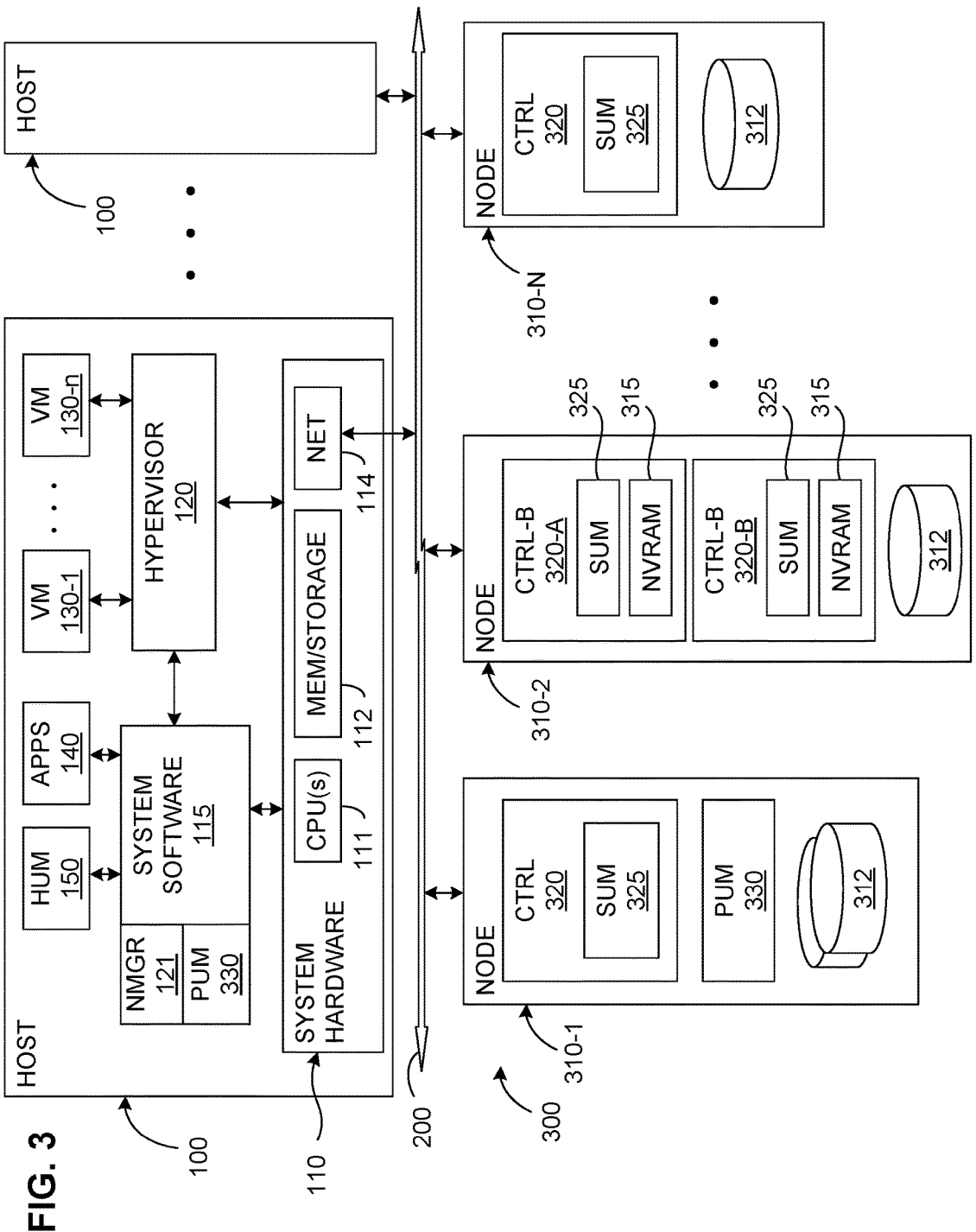
FIG. 3 illustrates an embodiment in which a primary upgrade manager is located within a host instead of in a storage node.

Embodiments of the invention use three main components to coordinate software upgrades. These components may be installed and launched in their respective systems using any preferred, known method:

A Primary Upgrade Manager (PUM) 330, installed within one of the nodes (as illustrated in FIG. 1), hosts (as illustrated in FIG. 3), or in a separate, possibly dedicated "orchestration" or "management" node/controller that runs the PUM, to coordinate the upgrade of the multiple controllers 320 and host(s) 100. Merely by way of example, the configuration shown in FIG. 1, that is, with the PUM in a node, is used in the explanation below, although the PUM will be able to carry out the same functions in configurations as in FIG. 3, with the PUM installed in a host or any other component of the overall distributed storage system, which would including those such as the aforementioned dedicated "orchestration" or "management" node/controller.

A Secondary Upgrade Manager (SUM) 325, installed within each node, for example, within the software of its controller 320. The SUM receives software updates from the PUM and upgrades the software on its respective node when instructed to do so. In the node that contains the PUM, it would be possible to combine the PUM and its SUM, or the SUM could be configured as a separate software component that communicates with the PUM.

A Host Upgrade Manager (HUM) 150 is installed on the host, either as a separate, dedicated software component, or simply as a process run by whatever software is used on the host to install other code as well. Once installed, the HUM receives software updates from the PUM 330 and upgrades the NMGR 121 software on the host when instructed to do so.

As mentioned above, the main features of different embodiments of the invention may be used in any distributed computing environment in which coordinated, efficient, upgrading of software is wanted. One environment in which the invention may be used is that of a distributed storage system. One such storage system is disclosed in U.S. patent application Ser. No. 14/464,733 ("Distributed Data Storage System with Key-Based Addressing"), the inventor of which is also an inventor of the invention disclosed herein. That storage system, referred to herein generally as the Distributed Virtual Array (DVA), will now be summarized, after which will follow a description of how embodiments of this invention may be used for software upgrading in the DVA; as skilled system programmers will understand, the described procedure will be similar or identical in other environments as well, requiring only design choices and easily understand adaptations, if needed at all.

Distributed Virtual Array (DVA)

Purely by way of example, the DVA is illustrated and described primarily with reference to a system in which the entities that read and write data to the distributed storage system are mainly virtual machines (VMs) running as guests on one or more host platforms. The DVA can, however, accommodate reads and writes of data by any type—or indeed mixed types—of entities, virtualized or not.

Figure 2:
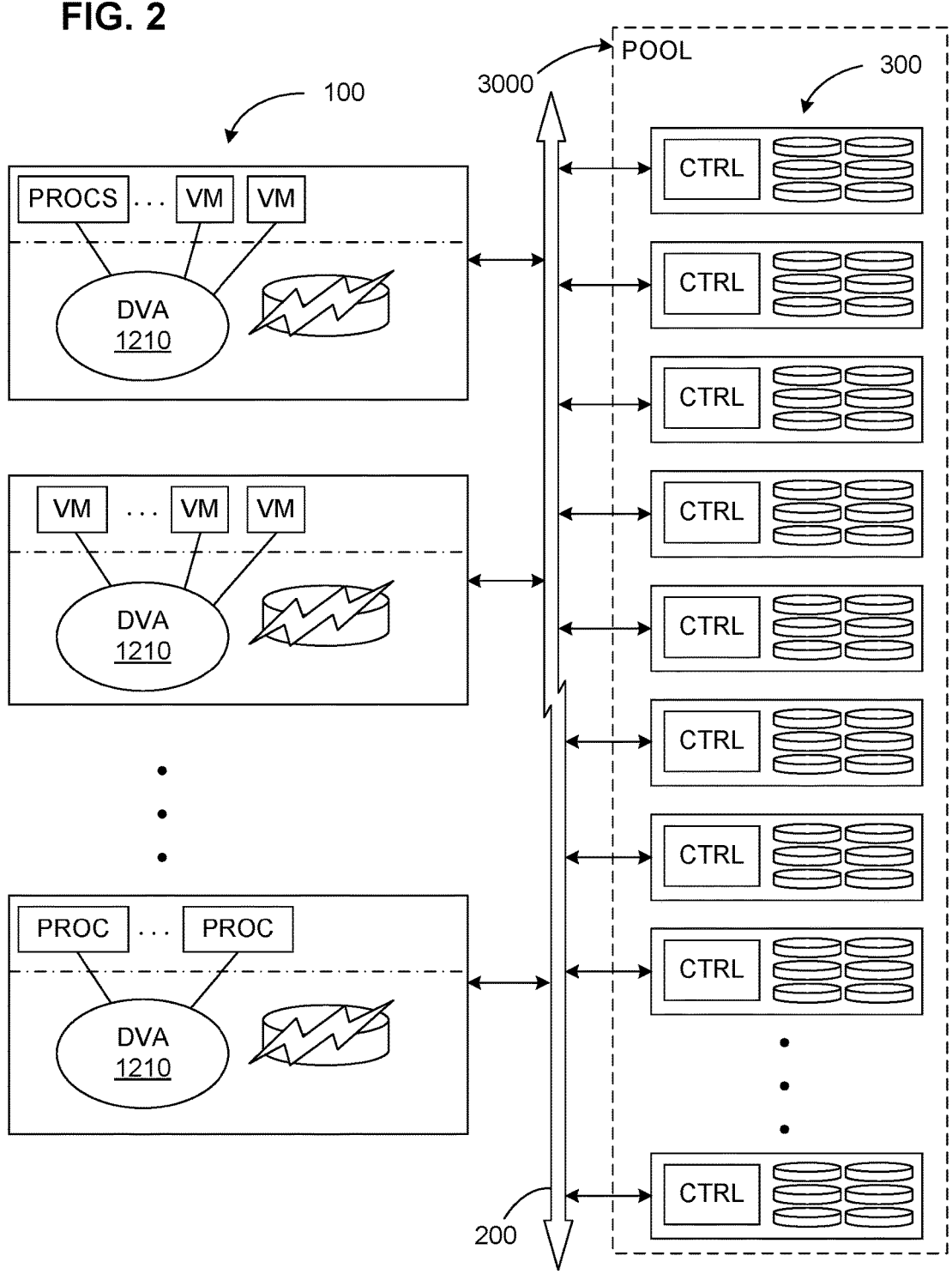
FIG. 2 illustrates hosts interacting via a network with a storage pool comprising several storage devices in one example of a distributed storage system that may benefit from embodiments of the invention.

FIG. 2 shows, at even a higher level than FIG. 1, the relationship between two main physical "sides" of a DVA: any number (including one) of hosts 100 and a Storage Pool 3000, which includes the storage nodes 300, which, from the perspective of the hosts, may form a single yet distributed storage system. Entities within the hosts 100 write data that is ultimately stored in the physical storage devices located within the Storage Pool 3000. The entities may be of any type, including virtual machines (shown as "VM"s) or more general, non-virtualized processes (shown as "PROCS").

Regardless of the configuration of hosts, each host system software layer preferably includes a host DVA software component 1210, which may run within a hypervisor (if the system supports VMs), or within the host OS, within a process, within a VM, or any other appropriate context. The host DVA component is responsible, for example, for communicating read/requests to the rest of the DVA system, ensuring proper formatting and identification of data sets to be transmitted, and maintaining the data structures that are included at the host side of the DVA system.

In one implementation of the DVA system as provided by Datrium, Inc., the Storage Pool does not have to be a file server or a block array, and hence has no need to export a file system or logical unit numbers (LUN), and storage clients do not need to access data through files, streams, or conventional numerical block addresses. Unlike a conventional block device, which has a fixed number N of blocks that are addressed by number, the Storage Pool 3000 in that implementation exports "container sets", which are dynamically-sized collections of related, named "containers". In the DVA context, a "container" is any body of digital data that a writing entity wishes to be stored as a plurality of associated, constituent sub-sets, referred to as "chunks".

In one embodiment, clients allocate new containers to a container set by writing a container with a new unique name or key that either the client assigns or that the system generates on behalf of the client. To read back a container, clients give the Storage Pool the name or key for the container they want to read. When the container is no longer needed, clients can deallocate the container, which shrinks the aggregate size of the container set and releases the storage capacity for the container back into the pool so that it can be allocated to some other new container in the same or a different container set.

The DVA Storage Pool may store containers as stripes. Disk striping in general is a well-known storage concept. Conventionally, disk striping entails dividing a set of data into stripe units and then spreading the stripe units across several persistent storage devices. Disk striping may be implemented with or without error correction, for example, in the form of parity. Parity information is typically encoded into a separate stripe unit within the stripe and stored on a device other than the one(s) holding the data stripe units that may be lost and need to be reconstructed. In the DVA, stripes are created and the stripe units (the "chunks") are assigned according to a unique and uniquely advantageous protocol, which may include a combination of the container data and additional, redundant, error-correction data that enables the pool to reconstruct lost data in the event of a hardware failure. The Storage Pool organizes the containers into several chunks, computes error-correction codes across these chunks, stores these computed codes in additional chunks, here called "ECC chunks", and stores all these chunks as a stripe in the pool. This invention does not presuppose the use of chunks, or stripes, or any other container subdivision, however, but rather may be implemented regardless of whether data sets are stored in whole (such as in RAID-1 mirroring), as stripes, etc.

U.S. patent application Ser. No. 14/464,733, mentioned above, details other advantages of the DVA system, such as procedures for handling failure of one or more chunk stores through use of a key-based layout table.

The use within a DVA system of the coordinated upgrading mechanisms according to the present invention will now be discussed. Note again that this is merely one example of a use of the invention, which is not restricted to a DVA environment or, indeed, to storage systems at all.

Host Upgrade Manager (HUM)

When adding a host to the DVA, the first step is to prepare the host by installing and configuring an initial version of software that includes an initial version of the Host Upgrade Manager (HUM) 150. Software installation is of course a well-known procedure, so this initial installation may be done in any manner suitable to the particular environment. In an environment running virtual machines of the type provided by VMware, this could include packaging the initial DVA software as a VIB (vSphere Installation Bundle). In more general Linux environments, it could be done with a tool such as RedHat's yum for installing the software as an RPM (Redhat Package Manager). Many other tools are also in use. The installation could also be done through direct access to the host in question. For hosts that boot over a network, the initial installation could include adding the initial software to the boot image that the host loads from the network at boot time. In some cases, the initial software could be included as part of the first software installed at the factory. In some embodiments, rather than initially installing a complete version of the DVA software, the only code installed initially is a module that then pulls the bulk of the DVA code from the PUM. Some embodiments might initially install a complete version.

Initial configuration may include formatting a plurality of storage devices to be "private", that is, dedicated for use by the host as part of the DVA component 1210, for example, to cache DVA data. The DVA-dedicated storage devices may be considered part of the general system storage 112, or may be a dedicated partition of system storage, or could even be a logically and physically distinct storage device, as long as it is within the addressable space of the system software 115 (or hypervisor 120, depending on the implementation). Most often these devices are typically internal flash drives, but other memory technologies and connectivities are possible. Note that, although the DVA-dedicated storage device(s) may be used by the one corresponding host, in the event of a host failure it may also be possible to reassign the device(s) for use by another host.

Initial configuration may also include setting parameters such as the amount of computational or memory resources that the DVA software may use. The parameters may also include indications of which DVA(s) the host should connect to and become part of.

The initial software preferably configures the host to run DVA software. As with other software, the DVA-related software is code comprising a set of digital information that is stored in a non-transitory, volatile or non-volatile storage device and causes one or more of the processors in the host to carry out the DVA functions. The DVA software to run may be referenced by a symbolic link updated at a later time to reference a new version of software after it is installed, without having to change the indication of the DVA software to run. The initial software may include code to update the indication of the DVA software to run and/or to update the software referenced by its symbolic link, such as a file "alias" or similar pointer to some other real file, directory, etc.

When the host first connects to the DVA, the initializing software determines if it has the correct software version for that DVA. If not, the HUM 150 contacts the PUM 330 to obtain the correct version of the software. This new version could include a new version of the HUM 150 itself. The HUM 150 then installs or directs the hypervisor 120 or other system software 115 to install this new software, preferably in a new location so as to not overwrite the current version. One way to accomplish this is simply to install the new software in a different folder. In the DVA environment, the updated host DVA software may include any other needed DVA components, although some components and data structures may need to be maintained unchanged across updates. For example, in DVA systems that allocate storage on the basis of a layout table, unless the entire DVA system is to be re-initialized, the allocation manager (such as a stripe manager) and its layout table should remain as is through the software update.

Once the new DVA software version is in place, the symbolic link and/or other indication of which software to run is updated, for example, to point to a new version folder, and the software is started so that the host can provide the DVA service to clients, including providing access to the data stored in the DVA to the VMs or other applications running on the host.

Prior to restarting the updated DVA host software, the running host software may receive an indication that the software will soon be restarted with a new version. The DVA host software may then respond by preparing any necessary files used by the host and the host-side storage for the upgrade. This could include, for example, flushing in-flight data and/or metadata to one or more DVA storage controllers 320, flushing in-flight data and/or metadata to the host's private storage devices, and/or synchronizing data or metadata structures related to host's private storage such as an index of the contents of the storage device. The metadata may include state information about the DVA system itself. The HUM may also store data structures in a special format, different from the normal running format, which may be chosen for easier loading by the new version of the software. For example, data or metadata may be written out in an uncompressed format instead of a compressed format. These flushing and rewriting operations have the primary purpose of either making the startup of the new version of the DVA host software faster or reducing the incompatibilities between the software versions, thereby reducing the complexity of implementing software that is compatible across the software upgrade.

Once the DVA host software restarts, it reconnects to the DVA (in particular, the nodes 300) and resumes operation, possibly involving loading previously stored data or metadata from the DVA-dedicated storage. When reconnecting, the HUM 150 checks that the DVA storage controllers 320 are running the new version of the software. If not, it may either restart with the previous version of the DVA software or pull the correct version from the DVA and repeat the upgrade operation sequence.

Secondary Upgrade Manager (SUM)

The Secondary Upgrade Manager (SUM) 325 plays a role similar to the HUM 150 except that it operates for and within its respective storage node 300 and storage controller 320. Single-controller storage nodes may be similar in operation to the hosts but the initial installation of DVA-related software will include the PUM 330 (in the selected node, such as 310-1) as well as the SUM 325. All the same options for initial installation as the hosts are possible for the storage nodes as well.

When it is time for an upgrade, the SUM 325 first receives the new software from the PUM 330 and copies it into place within its respective controller. In some systems, the controllers may boot over the network from a remote image, in which case the new software may be installed in the new boot image for the controller. The PUM 330 may then signal the SUM 325 that it is time to prepare for the upgrade.

The SUM 325 coordinates the components within the node and causes them to prepare for the upgrade. Coordination and preparation operations will typically include flushing data and/or metadata to disk, and writing out data and/or metadata, for example, in a format for easy consumption by the new software. When appropriate, it indicates to the PUM that it is ready for the upgrade. Upon receiving the signal from the PUM, the SUM completes any final pre-upgrade steps and then restarts the software with the new revision.

Depending on the technology used, some storage nodes may have dual, redundant controllers. Node 310-2 in FIG. 1 is shown as being such a node, which is shown as having controllers CTRL-A (320-A) and CTRL-B (320-B). In such cases, a modified upgrade sequence may be used to take advantage of the dual controllers and achieve a faster upgrade time. Typically, storage controllers have some portion of non-volatile or battery-backed RAM (NVRAM) (such as NVRAM 315 in node 310-2) for in-flight data; some of the contents of this memory are typically mirrored, logically or physically, in the two controllers. In the dual-controller case, a component of the SUM may run on each of the controllers to coordinate the upgrade of the pair of controllers; alternatively, the PUM could coordinate with each controller individually.

Assume two controllers: Controller A and Controller B, such as CTRL-A and CTRL-B in node 310-2. First the SUM can copy the new software, received from the PUM, into place on at least one of the controllers, for example, Controller B. On signal, Controller B then prepares for the upgrade, which may include flushing data and/or metadata to persistent storage, writing data and/or metadata out in a format that eases upgrade, entering an inactive mode in which it is not actively processing new data, and signaling that it is ready for upgrade. It may then wait for an additional signal or proceed directly to restart the controller software with the new version of the software. During this time, the other controller, Controller A, may continue serving requests. When the Controller B has restarted, it may reload data or metadata into its memory, possibly from the specially formatted data and/or metadata saved for the purpose. Controller B may then start mirroring data in the NVRAM 315. Controller B may then also indicate to the PUM that it is ready, and upon receiving a signal, or just when it is ready, Controller B may take over the active load of the storage node. Because the new software will already be up and running and data and/or metadata will have been preloaded into memory, the time to transition the load from Controller A to Controller B can be very short—VMs and applications running on the host(s) may see a transient blip in performance, but they can keep running.

In the preferred embodiment, the switchover of the hosts to the new software is preferably coordinated with the switchover to Controller B and the new software so that the hosts are running the same version of software as the active controller and so that the time to switchover the hosts and nodes overlaps.

Once the load is running on Controller B with the new software, Controller A can then go through similar steps to upgrade its own software. When it has done so, it can re-establish the mirror, if any, between the controllers, and be ready in standby mode if the controllers run in an active/passive mode, or, if the controllers support an active/active mode, controller A can take back some of the load from Controller B.

Primary Upgrade Manager (PUM)

The Primary Upgrade Manager 330 orchestrates the upgrade process as follows:

First, the PUM obtains, from whatever source, which may be either automated or under administrator control, the new version of software that is to be deployed across the hosts and storage nodes in the DVA. It may obtain the new software by contacting another server or similar external source system over the network and receiving the software from it; or it may obtain the software from an attached peripheral device such as a disk drive, CD-ROM drive, thumbdrive, etc.

Next, the PUM prepares the hosts and nodes for the upgrade. This includes sending the new software to all the HUMs and SUMs. Once all of the hosts and nodes have the new software and all have indicated that they are prepared for the upgrade, the PUM sends a message to the HUMs and SUMs indicating that they should start the upgrade. More complex protocols such as two-phase or three-phase commit can be used to signal that the upgrade should take place and maximize the chance that all nodes upgrade together.

When the host is actively processing incoming data writes, it may be necessary to make several iterations of preparation for the upgrade before actually indicating that the upgrade should take place. Because some hosts or nodes may have a substantial amount of data to flush to persistent storage, there may be a long lag before the host or node indicates it is ready for upgrade. In this time, additional new data may have arrived at some or all of the hosts and some may have been sent from hosts to storage nodes. The PUM can in such a case tell the hosts and nodes to prepare again for upgrade. As long as the hosts and nodes can prepare more quickly when there is less recent data to be flushed to persistent storage, the time for the hosts and nodes to prepare should decrease with each prepare iteration. When all hosts and nodes respond within a maximum amount of time that they are prepared, the PUM may send the signal to the hosts and nodes to proceed with the upgrade.

In some cases, it may be preferred that the host, when signaled to prepare for an upgrade, pauses processing of incoming requests once it has flushed its data to local storage and/or one or more storage nodes. If it does not receive an additional signal to proceed with the upgrade within some short time period, it can resume processing of requests. In this way, it would be possible to quiesce the distributed system without incurring a significant outage. Once all the hosts and storage nodes are prepared quickly, a general signal to upgrade can be sent to all hosts and nodes.

With such preparation, the amount of disruption due to the upgrade can be minimized; moreover, by centralizing coordination of the upgrade using the PUM, the upgrade can proceed without the administrator having to manage the upgrade of each individual host or node. The invention is also more efficient when it comes to software upgrades in the host(s): The initial installation of the DVA software in the host, including the HUM, may be done using the same methods, including conventional methods, as are used to install other host software, but, after that, the administrator is freed from having to coordinate subsequent updates of the host-based DVA components, since these may be handled by the PUM, which is located within the overall distributed storage system as opposed to being or requiring communication and coordination with an external entity. In this embodiment, the initial installation of the host DVA software may therefore come from a different place than the subsequent upgrades, including from a source external to the hosts and nodes, such as from an external supervisory or administrative server or similar system.

The invention provides several advantages relative to the prior art. Examples of these advantages include:

Administrators can use standard software (e.g. Puppet) to configure hosts to be part of a DVA even though these host configuration tools may not be designed for upgrading a cluster of nodes in a way that minimizes disruption, even if these tools do not know how to deal with an appliance such as a storage system;

A separate, dedicated tool may be used to upgrade the DVA software on all the hosts/nodes in a DVA cluster with a single command (no need to upgrade each host/node individually) and to do so in a way that minimizes the disruption of the upgrade even though this DVA upgrade tool is not used for the initial configuration of a host to be part of a DVA.

All the hosts/nodes may be upgraded together. The DVA software thus does not need to support cross-version communication for most of its APIs.

Because the software upgrade is coordinated, it is possible for developers of the DVA software to rely on the software being at the same revision across the DVA. This means in turn that few, if any, internal APIs need to have cross-version compatibility; instead, this is required only for APIs that are exposed to the outside world or that are involved with the upgrade process itself.

Lazy Host Alternative Embodiment

The distributed upgrade method above describes a tightly coupled upgrade of the DVA software in the host(s) and storage controllers. In systems with more than one host 100, if the upgrade process on the hosts is fast enough that no preparation time is required for the hosts to resume serving requests, and the hosts do not, in general, communicate with each other but rather only with the storage controllers 320, then the coordinated upgrade may only be needed across the storage nodes 300. The hosts can instead employ a lazy approach to upgrade as described below.

Lazy host upgrading may operate in a manner similar to how a host first connects to a DVA: For example, whenever a host first establishes a connection with any other host, or with a node, it may exchange version information with that host or node, to determine if there is a mismatch; alternatively, before establishing such a connection, it may first directly query the PUM to see if it has the most recent version. If the host detects that there is a version mismatch, or that its version is outdated, it may download the correct version of the software from the PUM, install it, and start it running. If the storage controllers 320 all switch over to a new version of software at roughly the same time, the hosts will try to reconnect to the storage nodes, just as they do when recovering from a network outage or a software crash on the controller. When they reconnect, they will detect that they have the wrong version of software and initiate an upgrade, including receiving the new version of the software from the PUM and restarting with that new software. If the hosts also communicate with each other, then a host may discover during a reconnection to either a host or a storage node that it needs a new version of software and proceed with the upgrade.

If the hosts have leases on data objects they are receiving data writes for, and they can only process such writes while the leases have not expired, then lease expiration will ensure that the hosts try to contact another node in the DVA to renew the lease within a bounded amount of time. This lease expiration effectively puts an upper bound on the time until a host will notice that it needs to upgrade its software.

Lazy host upgrading also provides a mechanism for hosts that were temporarily unavailable or disconnected from the network to be upgraded at a later time when they reconnect to the DVA. The DVA as a whole can proceed to upgrade all available hosts and nodes even though a plurality of hosts' nodes may be unavailable because these unavailable nodes will eventually be upgraded if or when they reconnect. This mechanism prevents stalling of the DVA upgrade if any host node is not available at the time.

Scaling

Assume that the system includes a relatively large number N of hosts and nodes and that R ("Ready") of them (even all but one) respond within a set maximum response period that they are ready to accept a software upgrade, but the remaining "not ready" (NR) ones do not so respond. One possibility would be to delay the upgrade until another time, when all N hosts and nodes signal readiness to upgrade. Another option would be to stall the R ready hosts and nodes, causing them to wait until the other NR are ready, and then to perform the upgrade. Still another option is to upgrade the R ready hosts and nodes and to temporarily remove the NR hosts and nodes from service (serving data read/write requests) by, for example, revoking any leases on open files or storage objects that they may have. When any of the NR hosts or nodes becomes ready, it may determine if its software version is the most recent, and, if not, signal readiness for the software upgrade.

It would also be possible to incorporate into the decision, estimates of how long it will take hosts and/or nodes to be ready to accept software upgrades. For example, if a host is in the process of transferring or flushing a large data set (the size of which is generally known or derivable before the transfer begins) or must complete some other time-consuming process, then the PUM could send a "stand-by" signal to the other, ready nodes, indicating to them that they should not initiate any further transfers or processes that are too time-consuming (determined in any known manner, such as container size) while waiting for the "slow" host/node to be ready.

Implementation as Executable Code

The various software components making up the embodiments of the invention, in particular, the PUM, SUM, and HUM (as well as the host DVA component 1210, which may incorporate the HUM), will in general be embodied as processor-executable code that is stored in a non-transitory, volatile or non-volatile storage device located within the associated node or host. Upon execution, this code will cause the respective processor(s) to perform the steps used to implement the processes that carry out the PUM, SUM, and HUM functions described above. Any or all of the PUM, SUM, and HUM code may also be provided to users in the form of a computer program product on any known non-transitory medium.

What is claimed is:

1. A method for controlling operations of a distributed storage system that includes one or more hosts and one or more storage nodes operating according to host storage system software and node storage system software, respectively, in which the one or more hosts write data to and read data from one or more storage devices included within the one or more storage nodes, the method comprising:
   installing a host upgrade manager (HUM) within at least one of the one or more hosts;
   installing a primary upgrade manager (PUM) within the at least one of the one or more hosts or within at least one of the one or more storage nodes;
   installing a secondary upgrade manager (SUM) within the at least one of the one or more storage nodes;
   running host storage system software and node storage system software, wherein the host storage system software and the node storage system software control read and write interactions between the one or more hosts and the one or more storage nodes, and wherein the host storage system software and the node storage system software comprise different, cooperating portions of overall storage management software;
   detecting that the at least one of the one or more hosts is running an outdated version of the host storage system software;
   detecting that the at least one of the one or more storage nodes is running an outdated version of the node storage system software;
   upgrading the host storage system software by transferring, from the PUM and via the respective HUM, an upgraded version of the host storage system software to the at least one of the one or more hosts detected to be running the outdated version of the host storage system software; and
   upgrading the node storage system software by transferring, from the PUM and via the respective SUM, an upgraded version of the node storage system software to the at least one of the one or more storage nodes detected to be running the outdated version of the node storage system software.

2. The method of claim 1, further comprising detecting that any host is running an outdated version of the host storage system software by exchanging software version information when the host first establishes a connection to any other host or any storage node in the distributed storage system.

3. The method of claim 1, further comprising transferring the upgraded version of the node storage system software from the PUM to SUMs.

4. The method of claim 1, further comprising signaling to the PUM, from each SUM, that the SUM is ready to run the upgraded version of the node storage system software.

5. The method of claim 4, wherein node preparation for upgrading of the one or more storage nodes to which a host is connected comprises flushing data to local storage.

6. The method of claim 4, wherein node preparation for upgrading of the one or more storage nodes comprises installing the upgraded version of the node storage system software within the one or more storage nodes.

7. The method of claim 1, further comprising determining whether all SUMs installed within the one or more storage nodes to be upgraded have responded with respective readiness signals within a maximum response time and, if not, deferring upgrading of the one or more storage nodes that are ready to be upgraded.

8. The method of claim 1, further comprising determining whether all SUMs installed within the one or more storage nodes to be upgraded have responded with respective readiness signals within a maximum response time and, if not, stalling the one or more storage nodes that are ready to be upgraded until all of the one or more storage nodes that are ready to be upgraded have signaled readiness.

9. The method of claim 1, further comprising determining whether all SUMs installed within the one or more storage nodes to be upgraded have responded with respective readiness signals within a maximum response time and, if not:
  signaling to the SUMs installed within the one or more storage nodes that are ready to be upgraded to proceed with the upgrading; and
  removing from service the one or more storage nodes that are not yet ready for upgrading, determining the respective readiness signals from the one or more storage nodes removed from service and, if a version of node storage management code in the one or more storage nodes removed from service is not a most recent version, signaling to the one or more storage nodes removed from service to install and operate using an upgraded version of the node storage management code.

10. The method of claim 1, further comprising transferring the upgraded version of the host storage system software from the PUM to HUMs.

11. The method of claim 10, further comprising signaling to the PUM, from each HUM, that the HUM is ready to run the upgraded version of the host storage system software.

12. The method of claim 11, wherein host preparation for upgrading of the one or more hosts comprises flushing data to local storage.

13. The method of claim 11, wherein host preparation for upgrading of the one or more hosts comprises flushing data to the at least one of the one or more storage nodes.

14. The method of claim 11, wherein host preparation for upgrading of the one or more hosts comprises installing the upgraded version of the host storage system software within the one or more hosts.

15. The method of claim 10, further comprising determining whether all HUMs installed within the one or more hosts to be upgraded have responded with respective readiness signals within a maximum response time and, if not, deferring upgrading of the one or more hosts that are ready to be upgraded.

16. The method of claim 10, further comprising determining whether all HUMs installed within the one or more hosts to be upgraded have responded with respective readiness signals within a maximum response time and, if not, stalling the one or more hosts that are ready to be upgraded until all of the one or more hosts that are ready to be upgraded have signaled readiness.

17. The method of claim 10, further comprising determining whether all HUMs installed within the one or more hosts to be upgraded have responded with respective readiness signals within a maximum response time and, if not:
  signaling to the HUMs installed within the one or more hosts that are ready to be upgraded to proceed with the upgrading; and
  removing from service the one or more hosts that are not yet ready for upgrading, determining the respective readiness signals from the one or more hosts removed from service and, if a version of host storage management code in the one or more hosts removed from service is not a most recent version, signaling to the one or more hosts removed from service to install and operate using an upgraded version of the host storage management code.

18. The method of claim 1, further comprising:
  receiving, at the PUM, from a HUM installed within the at least one of the one or more hosts, a signal indicating that the at least one of the one or more hosts needs a correct version of the host storage system software; and
  transferring the correct version of the host storage system software to the HUM installed within the at least one of the one or more hosts for installation and execution.

19. The method of claim 18, wherein the at least one of the one or more hosts, before running the correct version of the host storage system software, pauses processing of read and write requests until the PUM sends to the HUM a signal to resume processing of the read and write requests using the correct version of the host storage system software.

20. The method of claim 1, further comprising receiving from any of SUMs a signal indicating a need for the upgraded version of the node storage system software, wherein the need is detected by one of the one or more hosts that is connected to the one or more storage nodes.

21. The method of claim 1, further comprising installing an initial version of host storage management code within the at least one of the one or more hosts from a source external to both the one or more hosts and the one or more storage nodes, but loading each upgraded version of the host storage management code from the PUM.

22. The method of claim 1, further comprising initially installing in the one or more hosts a respective loading module that loads the host storage management code from the PUM.

23. The method of claim 1, further comprising:
  determining within any host that an installed version of host storage management code is not current and signaling to the PUM a need for upgrading;
  pausing read and write operations between the host and any storage node to which the host is connected;
  receiving and installing an upgraded version of the host storage management code from the PUM;
  running the upgraded version of the host storage management code; and
  restarting the read and write operations between the host and any storage node to which the host is connected.

24. The method of claim 23, further comprising offloading selected host data to one of the one or more storage nodes after pausing the read and write operations between the host and any storage node to which the host is connected.

25. The method of claim 1, further comprising quiescing and upgrading all of the one or more hosts before restarting the one or more hosts as a group.

26. The method of claim 1, further comprising quiescing, upgrading, and restarting all of the one or more hosts sequentially.

27. The method of claim 1, wherein the at least one of the one or more storage nodes includes multiple storage controllers, including a first storage controller and a second storage controller, the method further comprising:
  downloading upgraded software from the PUM;
  inactivating the second storage controller;
  upgrading the second storage controller and continuing to service storage requests via the first storage controller;

restarting the second storage controller using an upgraded version of node storage management code and beginning servicing of storage requests via the second storage controller;

inactivating the first storage controller;

upgrading software on the first storage controller while servicing storage requests via the second storage controller; and restarting the first storage controller using the upgraded version of the node storage management code.

28. The method of claim 1, further comprising installing the PUM in a management node/controller that is separate from the one or more hosts and the one or more storage nodes.

29. A distributed storage system comprising:
one or more storage nodes running node storage system software, wherein at least one of the one or more storage nodes is detected to be running an outdated version of the node storage system software;
one or more storage devices included within the one or more storage nodes;
one or more hosts, comprising one or more processors, writing data to and reading data from the one or more storage devices included within the one or more storage nodes, and running host storage system software, wherein at least one of the one or more hosts is detected to be running an outdated version of the host storage system software;
a host upgrade manager (HUM) installed within at least one of the one or more hosts;
a primary upgrade manager (PUM) installed within the at least one of the one or more hosts or within at least one of the one or more storage nodes;
a secondary upgrade manager (SUM) installed within the at least one of the one or more storage nodes;
wherein the PUM is provided to upgrade the host storage system software and the node storage system software by transferring, via the respective HUM, an upgraded version of the host storage system software to the at least one of the one or more hosts detected to be running the outdated version of the host storage system software and by transferring, via the respective SUM, an upgraded version of the node storage system software to the at least one of the one or more storage nodes detected to be running the outdated version of the node storage system software;
wherein the host storage system software and the node storage system software control read and write interactions between the one or more hosts and the one or more storage nodes; and
wherein the host storage system software and the node storage system software comprise different, cooperating portions of overall storage management software.

30. The system of claim 29, further comprising means for detecting that any host is running an outdated version of the host storage system software by exchanging software version information when the host first establishes a connection to any other host or any storage node in the distributed storage system.

31. The system of claim 29, wherein the PUM is provided for transferring the upgraded version of the node storage system software to SUMs.

32. The system of claim 29, wherein SUMs are provided to receive the upgraded version of the node storage system software by copying the upgraded version of the node storage system software from a remote image separate from the PUM.

33. The system of claim 29, wherein each SUM is provided to signal to the PUM that the SUM is ready to install and run the upgraded version of the node storage system software to any of the one or more hosts connected to the one or more storage nodes.

34. The system of claim 33, wherein the at least one of the one or more hosts is provided to prepare for upgrading of the one or more storage nodes to which the at least one of the one or more hosts is connected by flushing data to local storage.

35. The system of claim 29, wherein upgrading SUMs installed within the one or more storage nodes to be upgraded is deferred unless the SUMs have responded with respective readiness signals within a maximum response time.

36. The system of claim 29, further comprising means for determining whether all SUMs installed within the one or more storage nodes to be upgraded have responded with respective readiness signals within a maximum response time and, if not, stalling the one or more storage nodes that are ready to be upgraded until all of the one or more storage nodes that are ready to be upgraded have signaled readiness.

37. The system of claim 29, further comprising means for determining whether all SUMs installed within the one or more storage nodes to be upgraded have responded with respective readiness signals within a maximum response time and, if not:
signaling to the SUMs installed within the one or more storage nodes that are ready to be upgraded to proceed with the upgrading; and
removing from service the one or more storage nodes that are not yet ready for upgrading, determining the respective readiness signals from the one or more storage nodes removed from service and, if a version of node storage management code in the one or more storage nodes removed from service is not a most recent version, signaling to the one or more storage nodes removed from service to install and operate using an upgraded version of the node storage management code.

38. The system of claim 29, wherein HUMs are provided to receive the upgraded version of the host storage system software by copying the upgraded version of the host storage system software from a remote image separate from the PUM.

39. The system of claim 29, wherein each HUM is provided to signal to the PUM that the HUM is ready to install and run the upgraded version of the host storage system software.

40. The system of claim 39, wherein the at least one of the one or more hosts is provided to prepare for upgrading of the one or more hosts by flushing data to local storage.

41. The system of claim 29, wherein upgrading HUMs installed within the one or more hosts to be upgraded is deferred unless the HUMs have responded with respective readiness signals within a maximum response time.

42. The system of claim 29, further comprising means for determining whether all HUMs installed within the one or more hosts to be upgraded have responded with respective readiness signals within a maximum response time and, if not, stalling the one or more hosts that are ready to be upgraded until all of the one or more hosts that are ready to be upgraded have signaled readiness.

43. The system of claim 29, further comprising means for determining whether all HUMs installed within the one or more hosts to be upgraded have responded with respective readiness signals within a maximum response time and, if not:

signaling to the HUMs installed within the one or more hosts that are ready to be upgraded to proceed with the upgrading; and removing from service the one or more hosts that are not yet ready for upgrading, determining the respective readiness signals from the one or more hosts removed from service and, if a version of host storage management code in the one or more hosts removed from service is not a most recent version, signaling to that the one or more hosts removed from service to install and operate using an upgraded version of the host storage management code.

44. The system of claim 29, wherein the PUM is provided to receive, from a HUM installed within the at least one of the one or more hosts, a signal indicating that the at least one of the one or more hosts needs a correct version of the host storage system software, and to transfer the correct version of the host storage system software to the HUM installed within the at least one of the one or more hosts for installation and execution.

45. The system of claim 44, wherein the at least one of the one or more hosts, before receiving the correct version of the host storage system software, pauses processing of read and write requests and flushes data to a local storage device until the PUM sends to the HUM a signal to proceed with installation and continued processing of the read and write requests using the correct version of the host storage system software.

46. The system of claim 29, wherein any of the one or more hosts connected to any of the one or more storage nodes is provided to receive from any of SUMs a signal indicating a need for the upgraded version of the node storage system software.

47. The system of claim 29, wherein the at least one of the one or more hosts is connected to a source system that is external to both the one or more hosts and the one or more storage nodes, from which an initial version of host storage management code is installed, but in which each upgraded version of the host storage management code is loaded from the PUM.

48. The system of claim 29, further comprising means for:

determining within any host that an installed version of host storage management code is not current and signaling to the PUM a need for upgrading;

pausing read and write operations between the host and any storage node to which the host is connected;

offloading selected host data to one of the one or more storage nodes;

receiving and installing an upgraded version of the host storage management code from the PUM;

reloading the selected offloaded host data;

running the upgraded version of the host storage management code; and restarting the read and write operations between the host and any storage node to which the host is connected.

49. The system of claim 29, wherein all of the one or more hosts are quiesced and then upgraded as a group.

50. The system of claim 29, wherein all of the one or more hosts are quiesced, upgraded, and then restarted sequentially.

51. The system of claim 29, wherein the at least one of the one or more storage nodes includes multiple storage controllers, including a first storage controller and a second storage controller, and wherein each of the first storage controller and the second storage controller is in turn inactivated, while the other of the first storage controller and the second storage controller continues to service requests, data of the inactivated first storage controller or the inactivated second storage controller is flushed to a persistent storage device within the at least one of the one or more storage nodes, an upgraded version of node storage management code is downloaded into the inactivated first storage controller or the inactivated second storage controller from the PUM into the second storage controller, and the inactivated first storage controller or the inactivated second storage controller is restarted, whereupon other of the first storage controller and the second storage controller is inactivated, has data flushed to a persistent storage device, and has the upgraded version of the node storage management code downloaded into the persistent storage device, and is then restarted so as to resume multi-controller storage request.

52. A method for controlling operations of a distributed storage system that includes one or more hosts and one or more storage nodes operating according to host storage system software and node storage system software, respectively, in which the one or more hosts write data to and read data from one or more storage devices included within the one or more storage nodes, the method comprising:

installing a host upgrade manager (HUM) within at least one of the one or more hosts;

installing a primary upgrade manager (PUM) within the at least one of the one or more hosts or within at least one of the one or more storage nodes;

installing a secondary upgrade manager (SUM) within the at least one of the one or more storage nodes;

running host storage system software and node storage system software, wherein the host storage system software and the node storage system software comprise host storage management code and node storage management code installed within the at least one of the one or more hosts and the at least one of the one or more storage nodes, respectively, wherein the host storage system software and the node storage system software control read and write interactions between the one or more hosts and the one or more storage nodes, and wherein the host storage system software and the node storage system software comprise different, cooperating portions of overall storage management software;

installing an initial version of the host storage management code within the at least one of the one or more hosts from a source external to both the one or more hosts and the one or more storage nodes;

determining within any host that the installed initial version of the host storage management code is not current and signaling to the PUM a need for upgrading, pausing read and write operations between the host and any storage node to which the host is connected, offloading selected host data to one of the one or more storage nodes, receiving and installing an upgraded version of the host storage management code from the PUM, reloading the selected offloaded host data, running the upgraded version of the host storage management code, and restarting the read and write operations between the host and any storage node to which the host is connected;

determining which of the one or more storage nodes are running an outdated version of the node storage management code and are to be upgraded;

determining whether all SUMs installed within the one or more storage nodes to be upgraded have responded with respective readiness signals within a maximum response time and,
  if so, upgrading the node storage management code in the one or more storage nodes that are ready to be upgraded by transferring, via the respective SUMs, an upgraded version of the node storage management code from the PUM to the respective one or more storage nodes that are ready to be upgraded, and
  if not, performing one of the following preliminary actions:
    deferring upgrading of the one or more storage nodes that are ready to be upgraded,
    stalling the one or more storage nodes that are ready to be upgraded until all of the one or more storage nodes that are ready to be upgraded have signaled readiness, and
    removing from service the one or more storage nodes that are not yet ready for upgrading, determining the respective readiness signals from the one or more storage nodes removed from service and, if a version of the node storage management code in the one or more storage nodes removed from service is not a most recent version, signaling to the one or more storage nodes removed from service to install and operate using the upgraded version of the node storage management code.

* * * * *